(12) United States Patent
Rogers et al.

(10) Patent No.: US 8,671,688 B2
(45) Date of Patent: Mar. 18, 2014

(54) COMBINED CYCLE POWER PLANT WITH THERMAL LOAD REDUCTION SYSTEM

(75) Inventors: David Lee Rogers, Marietta, GA (US); Rahul Jaikaran Chillar, Marietta, GA (US); Robert Frank Hoskin, Duluth, GA (US); Julio Enrique Mestroni, Atlanta, GA (US); Vijay Raghavendran Nenmeni, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/086,119

(22) Filed: Apr. 13, 2011

(65) Prior Publication Data

US 2012/0260668 A1 Oct. 18, 2012

(51) Int. Cl.
*F01K 7/24* (2006.01)
*F01K 13/02* (2006.01)
*F02C 6/08* (2006.01)
*F02C 6/00* (2006.01)

(52) U.S. Cl.
USPC .............. 60/658; 60/782; 60/39.182; 60/646

(58) Field of Classification Search
USPC ............. 60/39.5, 658, 657, 646, 39.091, 782, 60/795, 785, 39.182
See application file for complete search history.

(56) References Cited

U.S. PATENT DOCUMENTS

| | | | |
|---|---|---|---|
| 3,813,884 A * | 6/1974 | Ishikawa | 60/657 |
| 3,955,358 A | 5/1976 | Martz et al. | |
| 3,965,675 A | 6/1976 | Martz et al. | |
| 3,974,644 A | 8/1976 | Martz et al. | |
| 3,974,645 A | 8/1976 | Smith | |
| 4,007,587 A * | 2/1977 | Banthin et al. | 60/204 |
| 4,013,877 A | 3/1977 | Uram et al. | |
| 4,028,884 A | 6/1977 | Martz et al. | |
| 4,031,404 A | 6/1977 | Martz et al. | |
| 4,047,005 A | 9/1977 | Heiser et al. | |
| 4,201,924 A | 5/1980 | Uram | |
| 5,255,505 A | 10/1993 | Cloyd et al. | |
| 5,406,786 A | 4/1995 | Scharpf et al. | |
| 5,417,053 A | 5/1995 | Uji | |
| 5,473,898 A * | 12/1995 | Briesch | 60/646 |
| 5,490,377 A | 2/1996 | Janes | |
| 5,498,131 A * | 3/1996 | Minto | 415/216.1 |
| 5,535,584 A | 7/1996 | Janes | |
| 5,581,997 A | 12/1996 | Janes | |

(Continued)

FOREIGN PATENT DOCUMENTS

| | | |
|---|---|---|
| EP | 0619417 A1 | 10/1994 |
| EP | 0619417 B1 | 10/1994 |

(Continued)

*Primary Examiner* — Gerald L Sung
(74) *Attorney, Agent, or Firm* — Cantor Colburn LLP

(57) ABSTRACT

A combined cycle power plant is provided and includes a gas turbine engine to generate power, a heat recovery steam generator (HRSG) to produce steam from high energy fluids produced from the generation of power in the gas turbine engine, a steam turbine engine to generate additional power from the steam produced in the HRSG and a thermal load reduction system to reduce thermal loading of components of the HRSG and/or the steam turbine engine during at least startup and/or part load operations, which includes an eductor by which a mixture of compressor discharge air and entrained ambient air is injectable into the HRSG and/or an attemperator to cool superheated steam to be transmitted to the steam turbine engine.

4 Claims, 6 Drawing Sheets

(56) References Cited

U.S. PATENT DOCUMENTS

| | | | |
|---|---|---|---|
| 5,632,142 A | 5/1997 | Surette | |
| 5,632,143 A | 5/1997 | Fisher et al. | |
| 5,678,408 A | 10/1997 | Janes | |
| 5,778,675 A | 7/1998 | Nakhamkin | |
| 6,370,862 B1 | 4/2002 | Cheng | |
| 6,523,346 B1 * | 2/2003 | Hoffmann et al. | 60/646 |
| 6,782,703 B2 | 8/2004 | Dovali-Solis | |
| 6,923,004 B2 | 8/2005 | Chandran et al. | |
| 6,978,622 B2 * | 12/2005 | Dittmann et al. | 60/782 |
| 7,055,305 B2 * | 6/2006 | Baxter et al. | 60/39.5 |
| 7,107,774 B2 | 9/2006 | Radovich | |
| 7,124,591 B2 | 10/2006 | Baer et al. | |
| 7,272,934 B2 | 9/2007 | Chandran et al. | |
| 7,543,438 B2 | 6/2009 | Wojak | |
| 2002/0190137 A1 | 12/2002 | Cheng | |
| 2003/0182944 A1 | 10/2003 | Hoffman et al. | |
| 2004/0045300 A1 | 3/2004 | Dovali-Solis | |
| 2004/0079087 A1 | 4/2004 | Chandran et al. | |
| 2005/0034445 A1 | 2/2005 | Radovich | |
| 2006/0254280 A1 | 11/2006 | Briesch et al. | |
| 2007/0012045 A1 | 1/2007 | Chandran et al. | |
| 2008/0304954 A1 | 12/2008 | Hoffman et al. | |
| 2008/0309087 A1 | 12/2008 | Evulet et al. | |
| 2009/0077944 A1 | 3/2009 | Wojak | |
| 2009/0193787 A1 * | 8/2009 | West et al. | 60/39.182 |
| 2009/0205310 A1 * | 8/2009 | Hibshman et al. | 60/39.182 |
| 2009/0235669 A1 | 9/2009 | Wojak | |
| 2010/0064655 A1 | 3/2010 | Zhang et al. | |
| 2010/0272147 A1 | 10/2010 | Hannula et al. | |
| 2011/0000220 A1 | 1/2011 | Hibshman | |

FOREIGN PATENT DOCUMENTS

| | | |
|---|---|---|
| EP | 0634562 A2 | 1/1995 |
| EP | 0634562 A3 | 1/1995 |
| EP | 0851104 A1 | 7/1998 |
| EP | 0851104 B1 | 7/1998 |
| EP | 1045114 A2 | 10/2000 |
| EP | 1921281 A1 | 5/2008 |
| EP | 2042470 A2 | 4/2009 |
| EP | 2243936 A1 | 10/2010 |
| WO | 9511375 A2 | 4/1995 |
| WO | 9511376 A1 | 4/1995 |
| WO | 9728288 A1 | 8/1997 |
| WO | 0060226 A1 | 10/2000 |
| WO | 0112754 A1 | 2/2001 |
| WO | 0214672 A1 | 2/2002 |
| WO | 03100233 A1 | 12/2003 |
| WO | 2006/091854 A2 | 8/2006 |
| WO | 2007053157 A2 | 5/2007 |
| WO | 2008034229 A1 | 3/2008 |

* cited by examiner

COMBINED CYCLE POWER PLANT WITH THERMAL LOAD REDUCTION SYSTEM

BACKGROUND OF THE INVENTION

The subject matter disclosed herein relates to a combined cycle power plant.

A combined cycle power plant consists of several pieces of major equipment. These include the gas turbine(s), a steam turbine and heat recovery steam generators (HRSG). The gas turbine produces power and exhaust energy. The gas turbine exhaust energy is captured by the HRSG and is used to convert water to steam, which is then expanded in the steam turbine to produce additional power.

During startup operations of the combined cycle plant, the gas turbine(s) feed exhaust energy to the HRSG to produce steam but the rate of change of gas turbine exhaust energy to the HRSG causes thermal stresses to the HRSG components. These stresses can lead to damage that impacts the life of the HRSG.

Therefore, a primary limitation in fast starting combined cycle power plants is the additional life expenditure per start that the HRSG experiences. In fact, in spite of the financial benefits of starting up power plants faster, the impact on HRSG life expenditure makes customers wary of technologies that help combined cycle plants startup faster.

BRIEF DESCRIPTION OF THE INVENTION

According to one aspect of the invention, combined cycle power plant is provided and includes a gas turbine engine to generate power, a heat recovery steam generator (HRSG) to produce steam from high energy fluids produced from the generation of power in the gas turbine engine, a steam turbine engine to generate power from the steam produced in the HRSG and a thermal load reduction system to control thermal loading of components of the HRSG and/or the steam turbine engine during at least startup and/or part load operations, which includes an eductor assembly by which a mixture of compressor discharge air and entrained fluids removed from the HRSG or entrained tank air is injectable into the HRSG and/or used to treat a superheater upstream from the steam turbine engine.

According to another aspect of the invention, a gas turbine engine to generate power including a compressor to compress inlet gases to be mixed with fuel and combusted, a heat recovery steam generator (HRSG) to produce steam from high energy fluids produced from the generation of power in the gas turbine engine and an eductor assembly including a first body having a first opening in fluid communication with fluids removed from the HRSG or tank air and a second opening in fluid communication with an interior of the HRSG, and a second body, which is receptive of received fluid from the compressor and supported within the first body such that the received fluid is dischargeable into the first body toward and through the second opening to thereby entrain the fluids removed from the HRSG or the tank air to flow as entrained fluids or entrained tank air from the first opening toward and through the second opening.

According to another aspect of the invention, a combined cycle power plant is provided and includes a steam source, a steam turbine engine disposed downstream from the steam source, a conduit by which steam is transmittable from the steam source to the steam turbine engine, a primary and finishing superheaters operably disposed along the conduit to superheat steam therein, an attemperator operably interposed between the primary and finishing superheaters to cool the superheated steam and an eductor assembly by which a mixture of compressor discharge air and entrained fluids removed from the steam source or entrained tank air treats at least one of the primary and finishing superheaters.

According to yet another aspect of the invention, a combined cycle power plant is provided and includes a gas turbine to produce gas turbine exhaust output from a gas turbine outlet, a heat recovery steam generator (HRSG) disposed downstream from the gas turbine outlet to be receptive of a stream of the exhaust and a coolant injector disposed in an interior of the HRSG downstream from the gas turbine outlet to inject coolant into the stream of the exhaust to thereby cool and re-direct the stream of the exhaust in the HRSG interior.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Aspects of the present invention are directed to comprehensive strategies to manage impact of gas turbine exhaust energy during combined cycle startup operation and/or part load operation. The strategies include but are not limited to management of thermal stresses in critical areas of a heat recovery steam generator (HRSG) during startup and reductions in gas turbine exhaust energy during startup and/or part load operations.

Startup operations of a combined cycle power plant include gas turbine engine startup whereby a combustor lights-off and a flame is established in the combustor. Hot exhaust gases are produced and quickly propagate downstream and can impinge on HRSG components that are located aft of the gas turbine engine exit flange. This can cause the HRSG components to undergo a rapid change in temperature from less than 0° Fahrenheit to above 1200° Fahrenheit in under 10 seconds as the flow across the HRSG components changes from relatively cool air (before combustor light-off) to relatively hot combustion gases (after combustor light-off). This condition can lead to thermal damage of the HRSG components but can be alleviated by the use of coolant flow. For example, compressor bleed flow may be routed through an eductor assembly to thereby entrain ambient air so that flow from the eductor assembly can be significantly lower than the relatively hot combustion gases and input into the HRSG or other plant components to reduce the temperature change. Thermallyinduced stresses are thereby reduced with component life correspondingly extended. In addition, since damage associated with fast startup can be avoided, the ability to perform fast startups of combined cycle power plants will be improved along with reductions in pollutant emissions, which are associated with part load operations.

Figure 1:
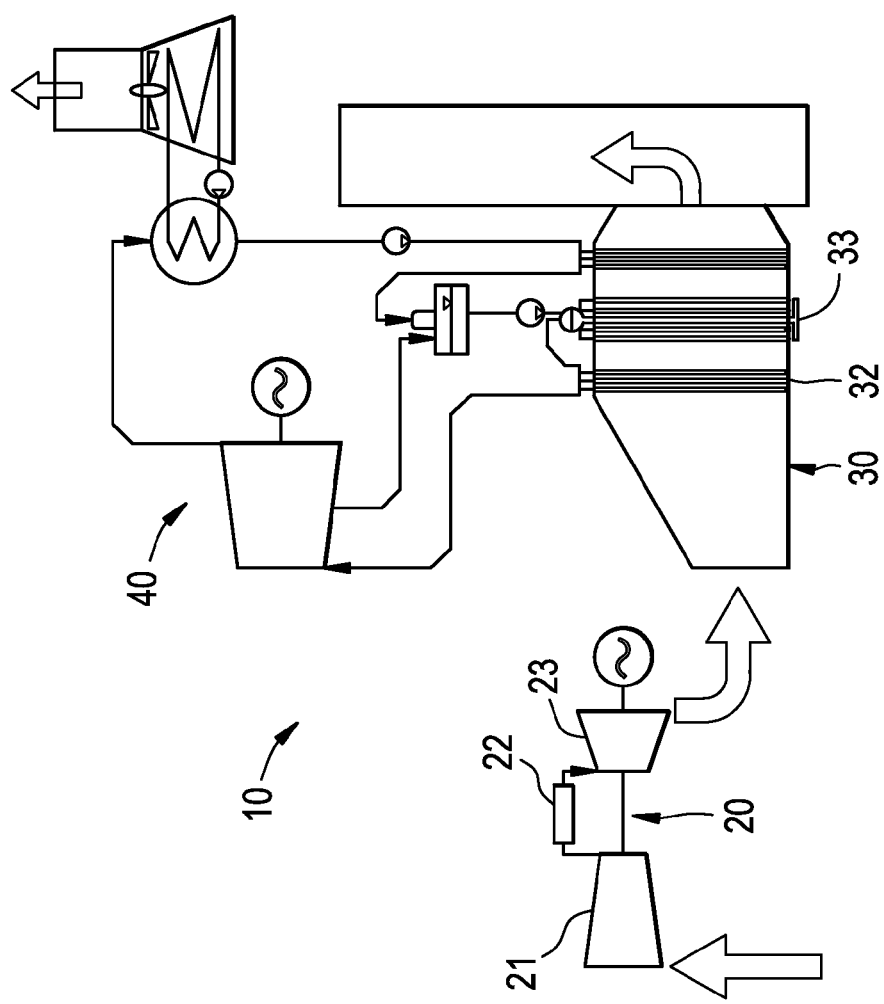
FIG. 1 is a schematic illustration of a combined cycle power plant.
Figure 2:
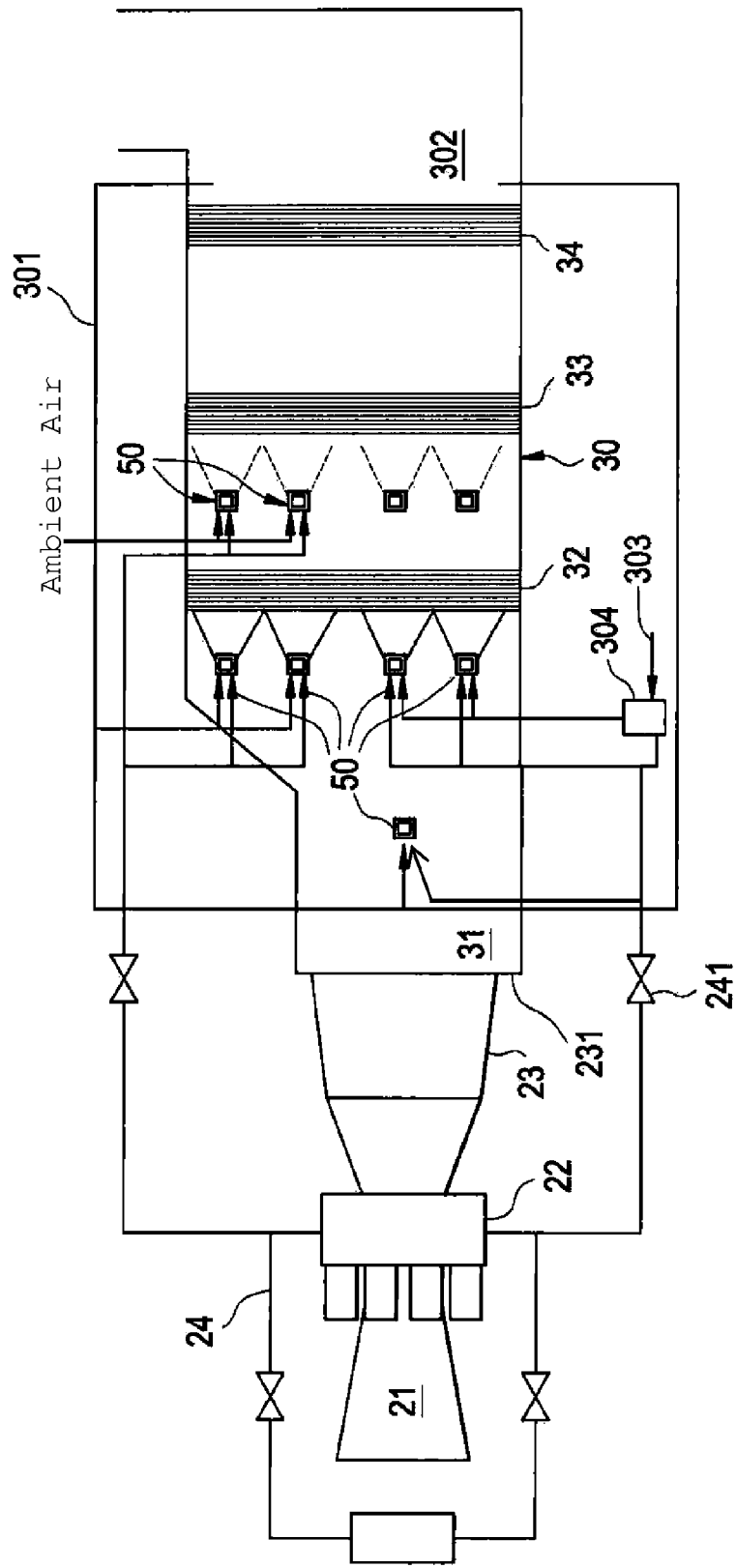
FIG. 2 is a side sectional view of components of the combined cycle power plant of FIG. 1.
Figure 3:
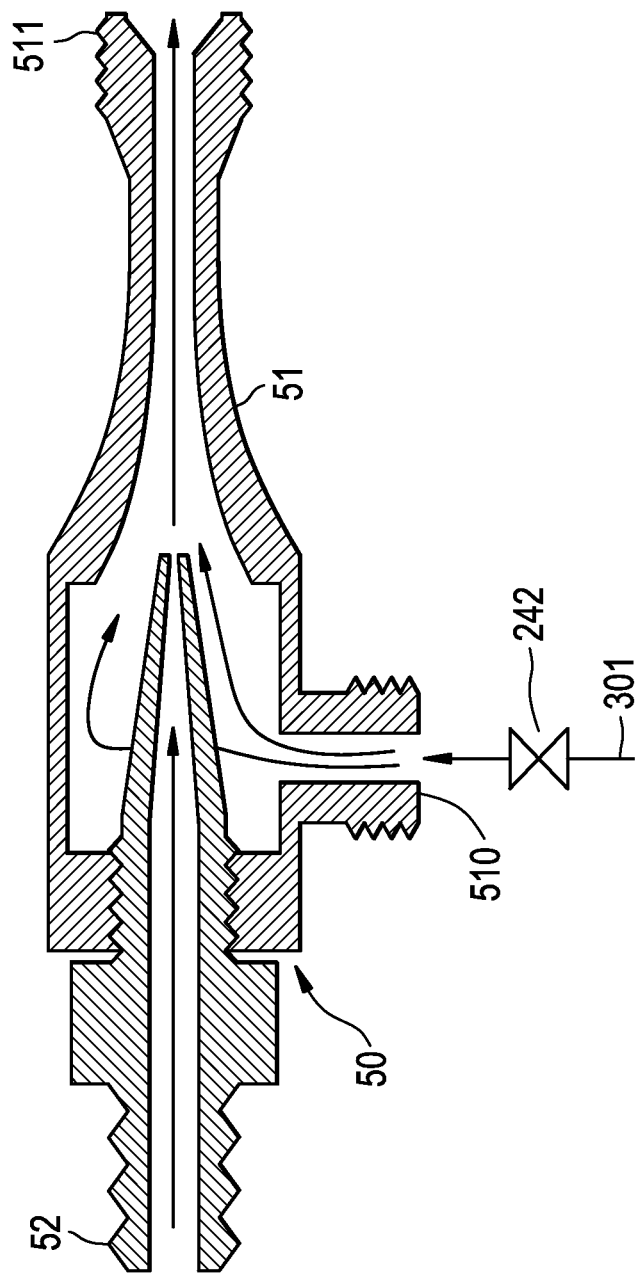
FIG. 3 is an enlarged view of an eductor assembly.

With reference to FIGS. 1-3, a combined cycle power plant 10 is provided. The combined cycle power plant 10 includes a gas turbine engine 20 that produces power and exhaust energy, a heat recovery steam generator (HRSG) 30 that captures the exhaust energy produced in the gas turbine engine 20 and uses the exhaust energy to convert water to steam and a steam turbine engine 40. The steam produced in the HRSG 30 is transmitted to the steam turbine engine 40 where the steam is expanded to produce additional power.

The combined cycle power plant 10 further includes a thermal load reduction system to be described below. The thermal load reduction system reduces thermal loading of components of the HRSG 30 and/or the steam turbine engine 40 during at least startup and/or part load operations of the combined cycle power plant 10. The thermal load reduction system includes an eductor assembly 50 (see FIGS. 2-4) by which a mixture of compressor discharge air from a compressor of the gas turbine engine 20 and other fluids is injectable into the HRSG 30 to cool, for example, hot spots within the HRSG 30 and/or components in the HRSG 30. These other fluids may include, for example, entrained fluids 301 that are removed from relatively cool stages 302 of the HRSG 30 and entrained air 303 from the compressor or an external compressor that is fed to tank 304. The tank 304 may be sized to provide flow for the duration of operation of the system. In an example, when the system is ready to operate, the air 303 is derived from the tank 304 so that an efficiency of the air injection system may be improved and the eductor assembly 50 (to be described below) does not have to work as much to provide a comparable level of cooling. The air 303 may further include a quantity of water and/or nitrogen ($N_2$).

The mixture of compressor discharge air and at least the fluids 301 and the air 303 can also be used to cool a superheater upstream from the steam turbine engine 40 for improved attemperation control during at least part load operation, for improved turndown by decreasing pollutant (CO) emissions and for improved performance at turndown. In accordance with embodiments, the mixture may include as little as zero parts ambient air to as much as about 4 or more parts fluids 301 or air 303 to about 1 part compressor discharge air. Also, the combined cycle power plant 10 may further include a coolant injector 150, such as a dual slot circulation control airfoil (see FIG. 6), which is operably disposed downstream from the eductor assembly 50 in the HRSG 30.

By using the mixture of the compressor discharge air with the fluids 301 or the air 303, an appropriate amount of HRSG 30 cooling can be achieved while excessive cooling of the HRSG 30 can be avoided.

The gas turbine engine 20 of the combined cycle power plant 10 may include a compressor 21, a combustor array 22 and a turbine section 23. The compressor 21 compresses inlet air, the combustor array 22 combusts a mixture of fuel and the compressed inlet air and the turbine section 23 expands the products of the combustion to produce power and the exhaust energy. The HRSG 30 is disposed downstream from an outlet 231 of the turbine section 23 and is thereby receptive of the exhaust energy. The HRSG 30 is formed to define an HRSG interior 31 through which high pressure tubes 32, intermediate pressure tubes 33 and low pressure tubes 34 extend. The high pressure tubes 32, intermediate pressure tubes 33 and low pressure tubes 34 define high pressure, intermediate pressure and low pressure sections of the HSRG 30 and carry water that is heated by the exhaust energy. The heated water is thereby converted to steam which is transmitted to the steam turbine engine 40. The relatively cool stages 302 of the HRSG 30 may be defined downstream from an axial location of the low pressure tubes 34.

The combined cycle power plant 10 may further include an eductor assembly 50 including a first body 51 and a second body 52. The first body 51 is formed to define a first opening 510 disposed in fluid communication with at least the fluids 301 and a second opening 511 disposed in fluid communication with the HRSG interior 31. The second body 52 is fluidly coupled to the compressor 21 and thereby receptive of motive compressor air or fluid from the compressor 21. The second body 52 is tightly supported within the first body 51 such that the fluid received from the compressor 21 (hereinafter "the received fluid") is dischargeable from the second body 52 into an interior of the first body 51. The second body 52 is formed with a tapered end defining a narrowing opening through which the received fluid is discharged such that the received fluid flows toward and through the second opening 511. The action of the received fluid entrains at least the fluids 301 or the air 303, which communicate with the first opening 510, to similarly flow from the first opening 510 toward and through the second opening 511.

With this or a similar configuration, the received fluid and the fluids 301 or the air 303 may be injected into the HRSG interior 31 with a ratio of about zero to about 4 or more parts of the fluids 301 or the air 303 to about 1 part received fluid. Thus, a relatively small amount of the received fluid can produce a flow of coolant into the HRSG interior 31 of as little as zero to as much as about 5 or more times as much fluid, which can be employed to cool the HRSG interior 31 or those parts of the HRSG 30 that experience the highest stresses during startup, part load and/or transient operations without risking excessive cooling. The received fluid may include compressor discharge air or, more particularly, compressor discharge air that is diverted from an inlet bleed heat system 24 that is operably coupled to the compressor 21 at, for example, the $9^{th}$ or $13^{th}$ compressor stages.

As such, in an exemplary case, if the received fluid has a temperature of about 350-400° Fahrenheit and the fluids 301 or the air 303 have a lower temperature, the flow of coolant into the HRSG interior 31 may have a total temperature that is substantially cooler than the temperature of the received fluid and even more substantially cooler than the temperature of the exhaust energy entering the HRSG 30 from the gas turbine engine 20, which may have a temperature between 1,100 and 1,200° Fahrenheit. As such, a tendency of the exhaust energy to very quickly heat (i.e., in under 10 seconds) the HRSG 30 as a whole, to form hot spots in the HRSG 30 or to heat components of the HRSG 30 is reduced. This will permit fast startup of the combined cycle power plant 10 without increased risk of thermal damages.

In accordance with embodiments, the combined cycle power plant 10 may further include a control valve 241 and a valve 242. The control valve 241 is operably interposed between the compressor 21 and the eductor assembly 50 and/or otherwise coupled to the inlet bleed heat system 24 to limit an amount of the received fluid available to be received from the compressor 21 by the second body 52. The valve 242 may be manually or automatically operated to limit a flow of the fluids 301 or the air 303 through the first opening 510. An algorithm may be provided to control operations of the control valve 241 and the valve 242. This algorithm may determine a flow rate and operational duration of the eductor assembly 50 depending on startup time requirements of the combined cycle power plant 10, and the type of startup, for example, whether it is a hot, warm or cold startup.

As shown in FIG. 2, the eductor assembly 50 may be plural in number with each respective second opening 511 of each of the plurality of eductor assemblies 50 being disposed in fluid communication with the HRSG interior 31. The plurality of eductor assemblies 50 may be arrayed about the HRSG 30 in a regular or irregular array and may be upstream from the high pressure section thereof and/or the intermediate pressure section thereof. The plurality of eductor assemblies 50 may in fact be well upstream from the high pressure section proximate to the outlet 231.

Figure 4:
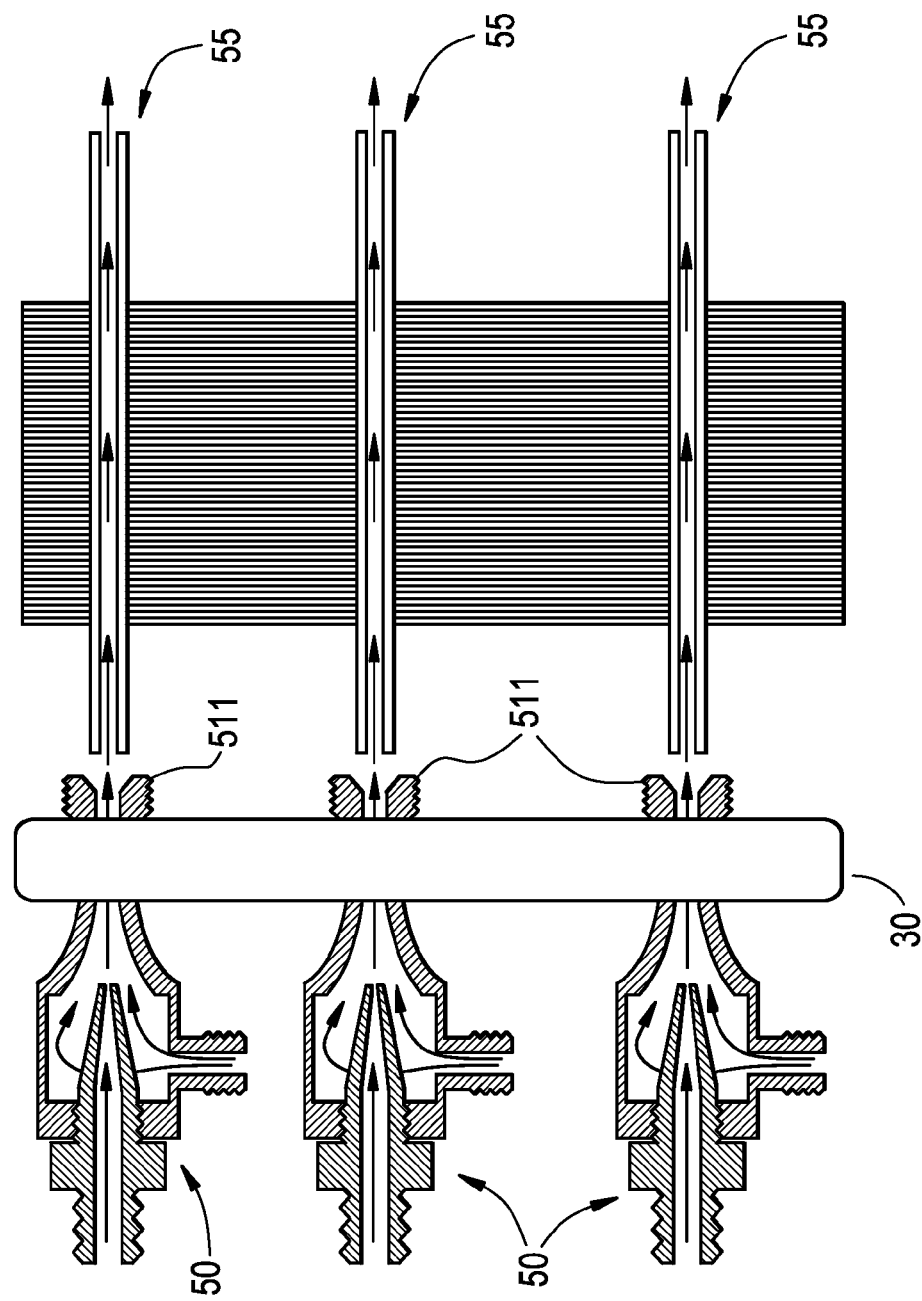
FIG. 4 is an enlarged view of an eductor assembly in accordance with embodiments.
Figure 6:
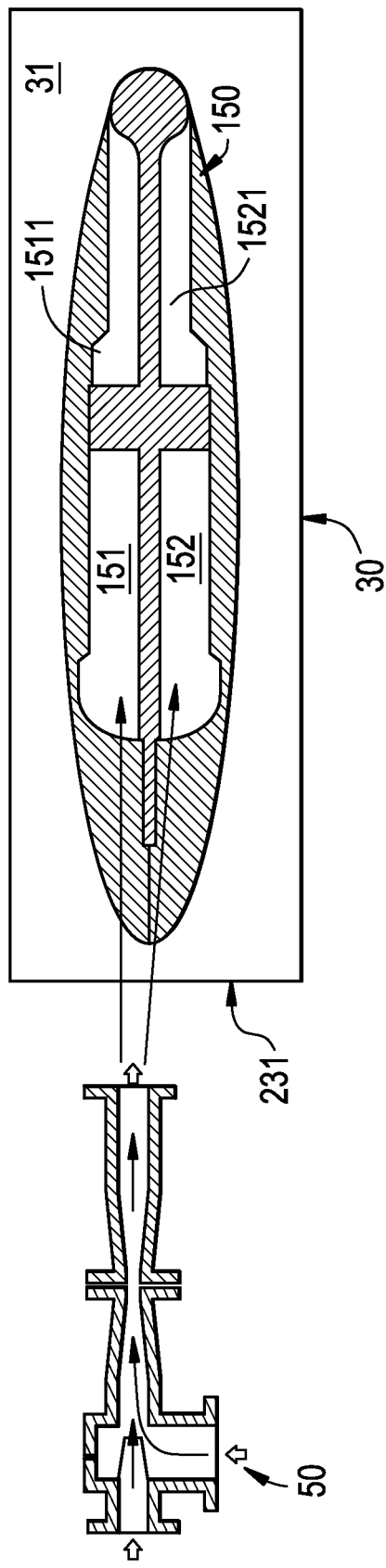
FIG. 6 is a schematic view of a coolant injector.

With reference to FIGS. 4 and 6, the eductor assembly 50 of the combined cycle power plant 10 may further include a lance 55 and/or the coolant injector 150. As shown in FIG. 4, the lance 55 is operably disposed at the second opening 511 to direct the received fluid and the fluids 301 or the air 303 toward a relatively deep portion of the HRSG interior 31 that the first body 51 may not otherwise have sufficient length to reach. As shown in FIG. 6, the coolant injector 150, as will be described below, is operably disposed at the second opening 511 to direct the received fluid and the fluids 301 or the air 303 within the HRSG interior 31.

Figure 5:
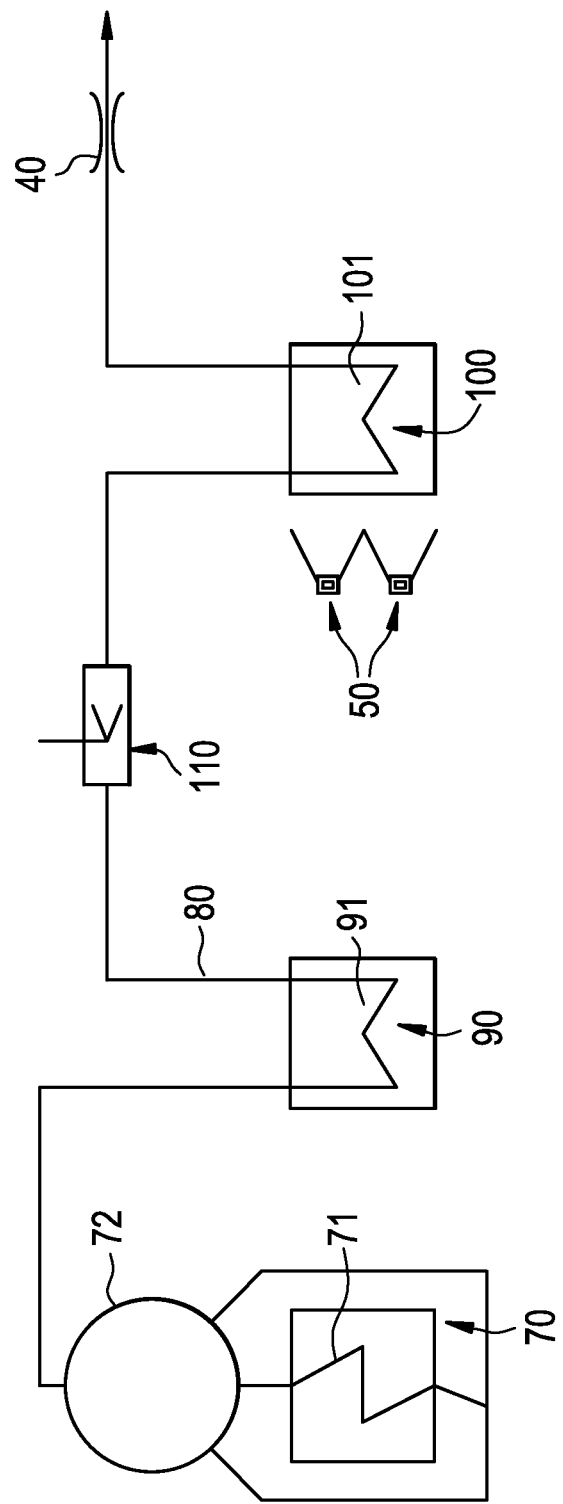
FIG. 5 is an enlarged schematic view of a steam turbine engine and components associated therewith.

With reference to FIG. 5, the combined cycle power plant 10 may include a steam source 70 having a high pressure evaporator 71 and a high pressure drum 72, the steam turbine engine 40 disposed downstream from the steam source 70, a conduit 80 by which steam is transmittable from the steam source 70 to the steam turbine engine 40, high pressure primary and finishing superheater stages 90 and 100 and an attemperator 110. The high pressure primary and finishing superheater stages 90 and 100 are each operably disposed along the conduit 80 and may respectively include plural high pressure primary superheaters 91 and high pressure finishing superheaters 101 to superheat steam in the conduit 80. The attemperator 110 is operably interposed between the primary and finishing superheater stages 90 and 100 and serves to cool the superheated steam as needed.

At least one of the primary and finishing superheater stages 90 and 100 may be cooled by the eductor assembly 50. In particular, as shown in FIG. 5 in which the eductor assembly 50 is disposed proximate to the finishing superheater stage 100, the finishing superheater stage 100 may be cooled by a mixture of compressor discharge air and the fluids 301 or the air 303 moving through and from the eductor assembly 50. In this way, the finishing superheater stage 100 may be cooled as required to control the steam temperature upstream from the steam turbine engine 40 thus reducing an amount of the attemperation required to be executed by the attemperator 110.

With reference to FIG. 6, the combined cycle power plant 10 may further include the coolant injector 150. As mentioned above, the coolant injector 150 may be a dual slot circulation control airfoil having at least two or more plenums 151, 152 defined therein. The coolant injector 150 may be plural in number and may be operably disposed downstream from the eductor assembly 50 and in the HRSG interior 31.

The coolant injector 150 may be disposed downstream from the outlet 231 of the turbine section 23 of the gas turbine engine 20 and configured to inject coolant, such as compressor discharge air or a mixture of compressor discharge air and the fluids 301 or the air 303 as produced by the eductor assembly 50, into a stream of the exhaust energy produced by the gas turbine engine 20. Coolant injection can occur via plenum 151, plenum 152 or via plenum 151 and plenum 152. Flow from plenum 151 exits the airfoil through an upper slot 1511 at the airfoil trailing edge, which tends to direct the coolant flow in a relatively downward direction. Flow from plenum 152 exits the airfoil through a lower slot 1521 at the airfoil trailing edge, which tends to direct the coolant flow in a relatively upward direction. Equal flow from both slots directs cooling flow in a relatively rearward direction. This coolant injection can be steady or oscillating through upper slot 1511, lower slot 1521 or both upper slot 1511 and lower slot 1521 and serves to cool the stream of the exhaust energy and additionally re-direct the stream of the exhaust energy in the HRSG interior 31. In this way, the stream of the exhaust energy can be directed away from hot spots formed in the HRSG 30 such that those hot spots can be cooled and/or damage caused by such hot spots can be avoided.

The coolant injection can be used to cool the HRSG interior 31 as a whole or to cool particular hot spots within the HRSG 30. These hot spots can be identified prior to formation thereof or during formation thereof by use of an infrared (IR) camera or similar device to map out temperature distribution and create a closed loop control to module bypass air flows. In either case, the coolant injector 150 can be aimed to inject the coolant directly at the hot spots or into the stream of the exhaust energy such that the coolant is carried toward the hot spots.

Each of the components and methods described herein can be employed in the combined cycle power plant 10 jointly or separately in accordance with manual or automatic control. Where automatic control is employed algorithms may be developed to dictate when and for how long each component and method is used and executed. For example, when the combined cycle power plant 10 needs to startup quickly, the embodiments of FIGS. 2-4 may be used with the embodiment of FIG. 5 subsequently turned on once a highest exhaust temperature level is reached.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant, comprising:
    a steam source;
    a steam turbine engine disposed downstream from the steam source;
    a conduit by which steam is transmittable from the steam source to the steam turbine engine;
    primary and finishing superheaters operably disposed along the conduit to superheat steam therein;
    an attemperator operably interposed between the primary and finishing superheaters to cool the superheated steam; and
    an eductor assembly by which a mixture of compressor discharge air and entrained fluids removed from the steam source or entrained tank air treats at least one of the primary and finishing superheaters.

2. The combined cycle power plant according to claim 1, wherein the steam source comprises a high pressure steam source including a high pressure evaporator and a high pressure drum.

3. The combined cycle power plant according to claim 1, wherein the primary and finishing superheaters are each plural in number.

4. A combined cycle power plant, comprising:
- a gas turbine engine to generate power;
- a heat recovery steam generator (HRSG) to produce steam from high energy fluids produced from the generation of power in the gas turbine engine;
- a steam turbine engine to generate power from the steam produced in the HRSG; and
- a thermal load reduction system to control thermal loading of components of the HRSG and/or the steam turbine engine during at least startup and/or part load operations, which includes:
- an eductor assembly by which a mixture of compressor discharge air combined with entrained fluids removed from the HRSG or entrained tank air is automatically injectable directly into the HRSG and/or used to treat a superheater upstream from the steam turbine engine based on a temperature of the HRSG.

* * * * *